US010927036B2

(12) United States Patent
Brückner et al.

(10) Patent No.: US 10,927,036 B2
(45) Date of Patent: Feb. 23, 2021

(54) UV-CURING PRIMER COMPOSITION FOR THE COATING OF GLASS

(71) Applicant: Marabu GmbH & Co. KG, Tamm (DE)

(72) Inventors: Christine Brückner, Schwieberdingen (DE); Jürgen Volkmann, Deizisau (DE); Sandra Besch, Neuhausen auf den Fildern (DE)

(73) Assignee: Marabu GmbH & Co. KG, Tamm (DE)

( * ) Notice: Subject to any disclaimer, the term of this patent is extended or adjusted under 35 U.S.C. 154(b) by 20 days.

(21) Appl. No.: 16/122,998

(22) Filed: Sep. 6, 2018

(65) Prior Publication Data

US 2019/0077701 A1    Mar. 14, 2019

(30) Foreign Application Priority Data

Sep. 8, 2017    (DE) .................... 10 2017 215 922.7

(51) Int. Cl.
| | | |
|---|---|---|
| *C03C 17/30* | (2006.01) | |
| *C03C 17/00* | (2006.01) | |
| *C09D 4/00* | (2006.01) | |
| *C03C 17/245* | (2006.01) | |
| *C09D 5/00* | (2006.01) | |
| *C09D 11/101* | (2014.01) | |
| *C09D 11/102* | (2014.01) | |
| *C09D 11/324* | (2014.01) | |
| *C09D 11/38* | (2014.01) | |
| *C08F 230/08* | (2006.01) | |

(52) U.S. Cl.
CPC ........ *C03C 17/005* (2013.01); *C03C 17/2456* (2013.01); *C03C 17/30* (2013.01); *C09D 4/00* (2013.01); *C09D 5/002* (2013.01); *C09D 11/101* (2013.01); *C09D 11/102* (2013.01); *C09D 11/324* (2013.01); *C09D 11/38* (2013.01); *C03C 2218/119* (2013.01); *C03C 2218/31* (2013.01); *C03C 2218/32* (2013.01); *C08F 230/08* (2013.01)

(58) Field of Classification Search
CPC ....... C03C 17/005; C03C 17/30; C09D 5/002; C09D 11/101; C09D 11/322
See application file for complete search history.

(56) References Cited

U.S. PATENT DOCUMENTS

| | | |
|---|---|---|
| 4,684,697 A | 8/1987 | Chang et al. |
| 2008/0206504 A1 | 8/2008 | Hayes et al. |

FOREIGN PATENT DOCUMENTS

| | | |
|---|---|---|
| CN | 104151939 A | 11/2014 |
| DE | 2 255 118 A | 5/1973 |
| GB | 1 412 015 A | 10/1975 |
| GB | 1412015 | * 10/1975 |
| GB | 1 596 760 A | 8/1981 |

OTHER PUBLICATIONS

Extended European Search Report dated Feb. 11, 2019, of counterpart European Application No. 18192945.6.
Sommer, L.H. et al., "Aliphatic Organo-functional Siloxanes. III. Synthesis and Physical Properties of Organopolysiloxane Diesters", *Journal of the American Chemical Society*, 1955, vol. 77, Nr. 9, pp. 2485-2489.

* cited by examiner

*Primary Examiner* — Kuo Liang Peng
(74) *Attorney, Agent, or Firm* — DLA Piper LLP (US)

(57) ABSTRACT

The invention relates to a UV-curing primer composition for the coating of glass, in particular glass hollow bodies, wherein the primer composition, in addition to reactive oligomers and/or reactive monomers and at least one photoinitiator, comprises at least one organosilane, which possesses at least one acetoxy radical, in particular 1 to 4 acetoxy radicals.

The invention further relates to use of at least one organosilane for providing a UV-cured primer layer on glass and/or an ink layer on glass, a method for coating glass, a substrate coated with a UV-cured primer layer, an ink and a kit.

19 Claims, No Drawings

UV-CURING PRIMER COMPOSITION FOR THE COATING OF GLASS

FIELD OF APPLICATION AND PRIOR ART

The invention relates to a UV-curing primer composition for the coating of glass, use of at least one organosilane for providing a UV-cured primer layer and/or ink layer on glass, a method for coating glass, a glass substrate at least partially coated with a UV-cured primer composition, an ink and a kit for providing a UV-cured primer layer and/or for providing an ink layer on glass.

Digital printing technology, in particular inkjet printing technology, is being used to an increasing extent in industrial printing applications. Compared to analogous methods, digital printing technology is characterized by a high degree of flexibility. Further advantages of this technology are that it obviates the need for fixed printing masters and offers the possibility of directly decorating objects of various shapes without contact, i.e. without using labels or stickers.

Of particular importance is direct decoration of containers of all types, in particular glass bottles. The essential requirements for such decoration include outstanding resistance of the decoration to the effects of water, for example condensed water, or water used in rinsing or pasteurization processes. The printing process can be integrated into existing bottling systems only if water resistance is sufficient.

As a rule, conventional methods for pre-treatment of surfaces to be printed comprise a pre-treatment step, such as for example flame treatment or flame pyrolytic deposition of amorphous silicon dioxide (the so-called Pyrosil®-method), which is combined with solvent-based primers. From a process engineering standpoint, however, application and drying of these primers is complicated. For example, process parameters must be precisely observed, which is often difficult in industrial practice. A further problem is that the primers often require the use of chemicals that are particularly problematic in direct decoration of food product packages. In addition, large amounts of solvents are used, and these solvents must be dried and removed, requiring high energy consumption, and must then be properly disposed of.

A further drawback is that conventional primers can only be applied to the entire surface, which further aggravates the above-mentioned drawbacks.

OBJECT AND MEANS FOR ACHIEVING OBJECT

The object of the invention is therefore to provide a digitally printable primer composition that avoids the drawbacks associated with conventional primers and is characterized in particular by highly favourable resistance to the effects of water. Furthermore, a particular object of the invention is to provide a corresponding coating process, a correspondingly coated glass substrate and a corresponding kit.

According to a first aspect, the invention relates to a UV-curing primer composition, i.e. a UV-curing bonding agent composition, for the coating of glass, in particular glass hollow bodies, wherein the primer composition, in addition to reactive oligomers and/or reactive monomers and at least one photoinitiator, comprises at least one organosilane, which possesses at least one acetoxy radical, in particular 1 to 4 acetoxy radicals, i.e. 1 acetoxy radical, 2 acetoxy radicals, 3 acetoxy radicals or 4 acetoxy radicals.

In particular, the glass hollow body can be a glass container or a glass bottle.

In the context of the present invention, the term "primer composition" is to be understood as referring to a composition that comprises at least one primer and therefore has adhesion-promoting properties. Preferably, (at least) the at least one organosilane of the present invention acts as an actual primer or bonding agent.

In the context of the present invention, the term "UV-curing primer composition" is to be understood as referring to a primer composition that can be partially or completely cured under the effect of ultraviolet radiation (UV radiation).

In the context of the present invention, the term "primer ink" is to be understood as referring to an ink, in particular a white, coloured or colourless ink, that has at least one primer and therefore possesses adhesion-promoting properties. Preferably, (at least) the at least one organosilane of the present invention acts as an actual primer or bonding agent.

In the context of the present invention, the term "UV-curing primer ink" is to be understood as referring to a primer ink that can be partially or completely cured under the effect of ultraviolet radiation (UV radiation).

In the context of the present invention, the term "ultraviolet radiation (UV radiation)" is to be understood as preferably referring to radiation in a wavelength range of 100 nm to 450 nm, in particular in a wavelength range of 100 nm to 420 nm.

In the context of the present invention, the term "reactive oligomers" refers to oligomers that can be caused to react under the effect of ultraviolet radiation (UV radiation), in particular in the presence of photoinitiators, and in particular can participate in radical polymerisation and/or crosslinking reactions with partial or complete curing of the primer composition according to the invention. Alternatively or additionally, the reactive oligomers can be intended for setting the viscosity, in particular a viscosity suitable for digital printability, of the primer composition according to the invention. The reactive oligomers can generally be monofunctional and/or multifunctional oligomers.

In the context of the present invention, the term "oligomers" refers to compounds that are composed of a number of monomer units, i.e. two or more monomer units, and can comprise, depending on the number of monomer units, not only low-molecular-weight compounds, but also high-molecular-weight or polymeric compounds. For example, the term "reactive oligomers" within the meaning of the present invention can comprise not only low-molecular-weight reactive compounds, but also reactive polymers.

In the context of the present invention, the term "reactive monomers" refers to monomers that can be caused to react under the action of ultraviolet radiation (UV radiation), in particular in the presence of photoinitiators, and in particular can participate in radical polymerisation and/or crosslinking reactions with partial or complete curing of the primer composition according to the invention. Alternatively or additionally, the reactive monomers can be intended for setting the viscosity, in particular a viscosity suitable for digital printability, of the primer composition according to the invention. The reactive monomers can generally be monofunctional and/or multifunctional monomers.

The invention is characterized in particular by the following advantages:

In a particularly advantageous manner, the primer composition according to the present invention is digitally printable, in particular by means of an inkjet printing process.

The UV-curing primer composition according to the present invention possesses highly favourable resistance to the effect of water, even at elevated temperatures. The primer composition according to the invention is therefore particularly suitable for the direct decoration (decoration by a digital printing process) of glass surfaces. In particular, the resistance to water allows in an advantageous manner the integration of a digital printing process into a glass container filling system, making it possible to significantly simplify the production of bottled and at the same time digitally printed glass containers.

The at least one organosilane contained in the primer composition according to the invention is configured, because of its preferably multifunctional, in particular bifunctional, nature, to bring about the adhesion or coupling of the primer composition both to a glass surface and to a subsequently applied coating, preferably composed of ink, in particular UV-curing ink. In this case, the adhesion or coupling to the glass surface generally takes place by hydrolysis of the organosilane, wherein the organosilane is capable, because of silanol functional groups released by hydrolysis, of bonding to the glass surface, preferably covalently. For example, hydrolysis of the organosilane can be initiated by traces of moisture contained in the glass surface and/or by hydroxyl groups contained in the reactive oligomers and/or reactive monomers.

A further advantage is that the primer composition according to the invention does not have a corrosive action, despite the corrosive properties of many organosilanes with acetoxy radicals. Generally, therefore, the use of corrosion inhibitors is unnecessary.

Accordingly, the UV-curing primer composition according to the present invention can be free of corrosion inhibitors.

As the primer composition according to the present invention is a UV-curing composition, the use of solvents is also unnecessary. This makes it possible to avoid the drawbacks described in connection with conventional primers, such as in particular the energy-demanding separation of solvents and the proper disposal thereof.

The UV-curing primer composition according to the present invention is therefore preferably a solvent-free, UV-curing primer composition.

Because of its suitability for printing by means of the inkjet printing process, the primer composition according to the invention can advantageously be applied only partially and therefore in a locally limited manner to a glass surface to be coated.

A further advantage is that the reactive components of the primer composition according to the invention show no or little tendency to agglomerate. The risk that the printing heads of digital printing systems may become clogged by agglomerates is therefore eliminated.

In an embodiment of the invention, the at least one organosilane of the primer composition has Formula 1 below:

where
n is 1, 2 or 3, preferably 3,
AcO is the acetoxy radical,
R is an alkyl radical, an alkoxy radical or an aryloxy radical,
Si is silicon,
L is a divalent linear or a linear (divalent) branched hydrocarbon radical, and
$R^1$ is a reactive organic group.

The at least one organosilane according to Formula I is characterized particularly advantageously in that silanol functional groups produced by hydrolysis of the at least one organosilane allow coupling, preferably covalent coupling, to a glass surface and the reactive organic group $R^1$ allows coupling, preferably covalent coupling, to a subsequently applied coating, in particular of ink. The coupling to the subsequently applied coating is preferably based on radical polymerisation and/or crosslinking reactions between reactive organic groups $R^1$ of the at least one organosilane and corresponding reactive components of the coating, for example an acrylate monomer and/or a methacrylate monomer and/or an acrylate oligomer and/or a methacrylate oligomer in the case of a coating with a UV-curing ink.

In a further embodiment of the invention, the radical R in Formula I is an alkyl radical selected from the group composed of a methyl radical, an ethyl radical, an n-propyl radical and an isopropyl radical.

In a further embodiment of the invention, the radical R in Formula I is an alkoxy radical selected from the group composed of a methoxy radical, an ethoxy radical, an n-propoxy radical and an isopropoxy radical.

In a further embodiment of the invention, the reactive organic group $R^1$ in Formula I is a reactive organic group that can be caused to react under the action of ultraviolet radiation (UV radiation), in particular in the presence of the at least one photoinitiator. Preferably, the reactive organic group participates in radical polymerisation and/or crosslinking reactions with partial or complete curing of the primer composition according to the invention and/or a subsequently applied UV-curing coating, in particular a UV-curing ink.

In a further embodiment of the invention, the reactive organic group $R^1$ in Formula I is a vinyl radical (ethenyl radical), an allyl radical, an acrylate radical or a methacrylate radical.

In a further embodiment of the invention, the divalent hydrocarbon radical L in Formula I is an alkylene radical, an alkenylene radical, an alkinylene radical or an arylene radical, in particular with 1 to 20 carbon atoms, preferably 1 to 8 carbon atoms, particularly preferably 1 to 3 carbon atoms. Preferably, the divalent hydrocarbon radical L is an alkylene radical, in particular a linear alkylene radical, preferably with 1 to 3 carbon atoms. For example, the divalent hydrocarbon radical L can be a methylene radical ($-CH_2-$), an ethylene radical ($-(CH_2)_2-$) or an n-propylene radical ($-(CH_2)_3-$).

In a further embodiment of the invention, the at least one organosilane according to Formula I is 3-methacryloxypropyltriacetoxysilane. This organosilane has been found to be particularly advantageous in the provision or production of a digitally printable and in particular water-resistant UV-curing primer composition and/or in the provision or production of a UV-cured primer layer on a glass surface.

In a further embodiment of the invention, the at least one organosilane is vinyltriacetoxysilane.

In a further embodiment of the invention, the at least one organosilane, in particular according to Formula I, has a content of 2 wt % to 50 wt. %, in particular 5 wt % to 30 wt. %, preferably 8 wt % to 20 wt. % relative to the total weight of the UV-curing primer composition. Furthermore, the UV-curing primer composition can comprise an organosilane according to Formula I as only organosilane.

In a further embodiment of the invention, the at least one organosilane of the primer composition has Formula II below:

$(AcO)_n(R)_{2-n}R^1$-L-Si—O—Si-L-$R^1(R)_{2-n}(AcO)_n$ (II)

where n is 1 or 2,

AcO is the acetoxy radical,

R is an alkyl radical, an alkoxy radical or an aryloxy radical,

Si is silicon,

L is a divalent linear or a divalent branched hydrocarbon radical, and $R^1$ is a reactive organic group.

The at least one organosilane according to Formula II is preferably the dimer of the organosilane according to Formula I.

The at least one organosilane according to Formula II, because of the reactive organic $R^1$ groups, can particularly advantageously participate in polymerisation and/or crosslinking reactions with partial or complete curing of the primer composition according to the invention.

In a further embodiment of the invention, the radical R in Formula II is an alkyl radical selected from the group composed of a methyl radical, an ethyl radical, an n-propyl radical and an isopropyl radical.

In a further embodiment of the invention, the radical R in Formula II is an alkoxy radical selected from the group composed of a methoxy radical, an ethoxy radical, an n-propoxy radical and an isopropoxy radical.

In a further embodiment of the invention, the reactive organic group $R^1$ in Formula II is a reactive organic group which, under the action of ultraviolet radiation (UV radiation), in particular in the presence of the at least one photoinitiator, can be caused to react. Preferably, the reactive organic group participates in radical polymerisation and/or crosslinking reactions with partial or complete curing of the primer composition according to the invention and/or a subsequently applied UV-curing coating, in particular a UV-curing ink.

In a further embodiment of the invention, the reactive organic group $R^1$ in Formula II is a vinyl radical (ethenyl radical), an allyl radical, an acrylate radical or a methacrylate radical.

In a further embodiment of the invention, the divalent hydrocarbon radical L in Formula II is an alkylene radical, an alkenylene radical, an alkinylene radical or an arylene radical, in particular with 1 to 20 carbon atoms, preferably 1 to 8 carbon atoms, particularly preferably 1 to 3 carbon atoms. Preferably, the divalent hydrocarbon radical L is an alkylene radical, in particular a linear alkylene radical, preferably with 1 to 3 carbon atoms. For example, the divalent hydrocarbon radical L can be a methylene radical (—$(CH_2)$—), an ethylene radical (—$(CH_2)_2$—) or an n-propylene radical (—$(CH_2)_3$—).

Particularly preferably, the organosilane according to Formula II is 1,3-bis(3-methacryloxypropyl)-1,1,3,3-tetraacetoxydisiloxane or 1,3-bis(methacryloxypropyl)-1,1,3,3-tetraacetoxysilane.

In a further embodiment of the invention, the at least one organosilane according to Formula II has a content of 0.1 wt % to 50 wt. %, in particular 0.2 wt % to 30 wt. %, preferably 0.4 wt % to 20 wt. %, in particular 0.4 wt % to 15 wt. %, relative to the total weight of the UV-curing primer composition.

In a further embodiment of the invention, the composition further comprises at least one pigment, in particular selected from the group composed of titanium dioxide, carbon black, aluminium, inorganic pigments, organic pigments and mixtures of at least two of the aforementioned pigments. In this embodiment of the invention, the primer composition can also be referred to as primer ink.

In a further embodiment of the invention, the at least one organosilane is an organosilane according to Formula I and an organosilane according to Formula II. In other words, it can be preferred according to the invention if the at least one organosilane is a mixture or combination of the organosilane according to Formula I and the organosilane according to Formula II. To put it yet another way, it can be preferred according to the invention if the UV-curing primer composition comprises both an organosilane according to Formula I and also an organosilane according to Formula II.

As an alternative, the UV-curing primer composition can comprise an organosilane according to Formula II as only organosilane.

In a further embodiment of the invention, the primer composition has a viscosity of between 2 mPas and 50 mPas, preferably between 5 mPas and 30 mPas, at a temperature of 40° C. The viscosity values disclosed in this paragraph have proven to be particularly advantageous in digital printing with the primer composition, in particular with respect to trouble-free operation of a printing head of a digital printing system.

In a further embodiment of the invention, the primer composition has a surface tension of between 15 mN/m and 50 mN/m, preferably between 20 mN/m and 40 mN/m. The surface tension values disclosed in this paragraph have proven to be particularly advantageous in digital printing with the primer composition, in particular with respect to its capacity to adhere to a glass surface.

In a further embodiment of the invention, the reactive oligomers are acrylate oligomers and/or methacrylate oligomers. The acrylate oligomers can be mono- and/or multifunctional acrylate oligomers. Accordingly, the methacrylate oligomers can also be mono- and/or multifunctional methacrylate oligomers. Furthermore, the acrylate oligomers and/or methacrylate oligomers can be a mixture of various acrylate oligomers and/or methacrylate oligomers. The acrylate oligomers and/or methacrylate oligomers can be selected in particular from the group composed of epoxy acrylates, epoxy methacrylates, polyester acrylates, polyester methacrylates, aliphatic urethane acrylates, aromatic urethane acrylates, aliphatic urethane methacrylates, aromatic urethane methacrylates, polyether acrylates, polyether methacrylates, silicone acrylates, silicone methacrylates, melamine acrylates, melamine methacrylates, dendritic acrylates, amine-modified acrylates and mixtures of at least two of the above-mentioned acrylate oligomers and/or methacrylate oligomers. For example, the acrylate oligomers and/or methacrylate oligomers can be selected from the group composed of methoxypolyethylene glycol monoacrylate, methoxypolyethylene glycol monomethacrylate, polyethylene glycol diacrylate, polyethylene glycol dimethacrylate, amine-modified polyether acrylates and mixtures of at least two of the above-mentioned acrylate oligomers and/or methacrylate oligomers.

In a further embodiment of the invention, the UV-curing primer composition has a content of reactive oligomers of 0.1 wt % to 60 wt. %, in particular 0.1 wt % to 30 wt. %, preferably 0.1 wt % to 15 wt. %, relative to the total weight of the UV-curing primer composition.

In a further embodiment of the invention, the reactive monomers are selected from the group composed of acrylate monomers, methacrylate monomers, acrylamide monomers, N-vinyl amide monomers, vinyl acrylate monomers and mixtures of at least two of the above-mentioned monomer types. The above-listed monomer types can generally be mono- or multifunctional, in particular bifunctional, monomer types. In particular, the reactive monomers can be a mixture of various acrylate monomers and/or methacrylate monomers and/or acrylamide monomers and/or N-vinyl amide monomers and/or vinyl acrylate monomers.

The acrylate monomers and/or methacrylate monomers can be selected in particular from the group composed of isobornyl acrylate, isobornyl methacrylate, octyldecyl acrylate, cyclic trimethylolpropane formal acrylate, lauryl acrylate, lauryl methacrylate, alkoxylated lauryl acrylate, isodecyl acrylate, isodecyl methacrylate, caprolactone acrylate, 2-phenoxyethyl acrylate, 2-phenoxyethyl methacrylate isooctyl acrylate, isooctyl methacrylate, 2-(2-ethoxyethoxy) ethyl acrylate butyl acrylate, benzyl acrylate, benzyl methacrylate, ethoxylated lauryl acrylate, ethoxylated phenyl acrylate, alkoxylated nonylphenol acrylate, alkoxylated nonylphenol methacrylate, hydroxyethyl methacrylate, tetrahydrofurfuryl acrylate, tetrahydrofurfuryl methacrylate, (octahydro-4,7-methano-1H-indenediyl)bis(methylene) diacrylate tricyclodecane dimethanol diacrylate, O-phenyl phenoxyethyl acrylate, phenoxybenzyl acrylate, trimethylcyclohexyl acrylate, tridecyl acrylate, tertiobutyl cyclohexyl acrylate, behenyl acrylate, caprolactone acrylate, stearyl acrylate butanediol diacrylate, 1,2-ethylene glycol diacrylate, 1,2-ethylene glycol dimethacrylate, 1,12-dodecanol diacrylate, 1,12-dodecanol dimethacrylate, 1,10-decanediol diacrylate, ester diol diacrylate, propoxylated 2-neopentyl glycol diacrylate, tris-(2-hydroxyethyl)-isocyanurate triacrylate, tris-(2-hydroxyethyl)-isocyanurate trimethacrylate, propoxylated neopentyl glycol diacrylate, hexanediol diacrylate, hexanediol dimethacrylate tripropylene glycol diacrylate, tetraethylene glycol diacrylate, dipropylene glycol diacrylate, ethoxylated bisphenol A-diacrylate, ethoxylated bisphenol A-dimethacrylate, alkoxylated hexanediol diacrylate, 3-methyl-1,5-pentanediol diacrylate, alkoxylated cyclohexane dimethanol diacrylate, tricyclodecane dimethanol diacrylate, trimethylol propane triacrylate, alkoxylated trimethylol propane triacrylate, ethoxylated trimethylol propane triacrylate, trimethylol propane trimethacrylate, glycerol propoxylate triacrylate, pentaerythritol triacrylate, dipentaerythritol pentaacrylate, dipentaerythritol hexaacrylate, ethoxylated pentaerythritol tetraacrylate, pentaerythritol tetraacrylate, pentaerythritol tetramethacrylate, ditrimethylol propane tetraacrylate, 2-N-morpholinoethyl methacrylate, polyethylene glycol diacrylate and mixtures of at least two of the above-mentioned acrylate monomers and/or methacrylate monomers.

The acrylamide monomers and/or N-vinyl amide monomers and/or vinyl acrylate monomers can be selected from the group composed of 4-acryloyl morpholine, N-vinyl-caprolactam, N-vinylpyrrolidone, 2-(2-vinyloxyethoxy) ethyl acrylate, 2-(2-vinyloxyethoxy)ethyl methacrylate and mixtures of at least two of the above-mentioned acrylamide monomers and/or N-vinyl amide monomers and/or vinyl acrylate monomers.

In a further embodiment of the invention, the UV-curing primer composition has a content of reactive monomers of 50 wt % to 95 wt. %, in particular 60 wt % to 90 wt. %, preferably 70 wt % to 85 wt. %, relative to the total weight of the UV-curing primer composition.

In further embodiment, the at least one photoinitiator is a photoinitiator of Norrish type I or a photoinitiator of Norrish type II or a mixture of photoinitiators, in particular of Norrish type I and/or Norrish type II.

In the context of the present invention, the term "photoinitiator of Norrish type I" is to be understood as referring to a photoinitiator that in particular under the effect of ultraviolet radiation (UV radiation) decomposes into two radicals, mostly by alpha cleavage. The radicals formed can then trigger chain polymerisation and/or crosslinking with partial or complete curing of the primer composition.

In the context of the present invention, the term "photoinitiator of Norrish type II" is to be understood as referring to a photoinitiator that is configured to abstract a hydrogen atom from a neighbouring molecule. This can then trigger chain polymerisation and/or crosslinking with partial or complete curing of the primer composition.

The photoinitiator can in particular be selected from the group composed of monomeric benzophenone derivatives, polymeric benzophenone derivatives, benzyl ketones, monomeric hydroxyketones, polymeric hydroxyketones, α-aminoketones, phosphine oxide derivatives, acylphosphine oxides, metallocenes, benzoin ethers, benzil ketals, α-hydroxyalkyl phenones, α-aminoalkyl phenones, monomeric thioxanthone derivatives, polymeric thioxanthone derivatives, isopropylthioxanthenones, aryl sulfonium salts, aryl iodonium salts, oxime derivatives, imidazole derivatives and mixtures of at least two of the above-mentioned photoinitiators.

In particular, the photoinitiator can be selected from the group composed of 2-hydroxy-2-methyl-1-phenylpropanone, 1-hydroxycyclohexyl-phenylketone, 2-hydroxy-1-(4-(4-(2-hydroxy-2-methylpropionyl)benzyl)phenyl)-2-methylpropan-1-one, 1-[4-(2-hydroxyethoxy)-phenyl]-2-hydroxy-methylpropanone, 2-benzyl-2-(dimethylamino)-4'-morpholinobutyrophenone, 2-dimethylamino-2-(4-methylbenzyl)-1-(4-morpholin-4-yl-phenyl)-butan-1-one, 2-methyl-1-[4-(methylthio)phenyl]-2-morpholinopropan-1-one, 2,2-dimethoxy-2-phenylacetophenone, 2,4,6-trimethylbenzoyl diphenylphosphine oxide, ethyl (2,4,6-trimethylbenzoyl)-phenylphosphinate, bis(2,4,6-trimethylbenzoyl) phenylphosphine oxide, benzophenone, 4-methylbenzophenone, 4-phenylbenzophenone, 2,4,6-trimethylbenzophenone, methyl-o-benzoylbenzoate, 4-(4-methylphenylthio)benzophenone, oligomeric alpha-hydroxyketone, oligo-(2-hydroxy-2-methyl-1-(4-(1-methylvinyl) phenyl)propanone, 1-[4-(4-benzoylphenyl sulfanyl)phenyl]-2-methyl-2-(4-methylphenyl sulfonyl)propan-1-one, benzil dimethyl ketal, 2-isopropylthioxanthone, 2,4-diethylthioxanthone, methyl benzoylformate, 4,4'bis(diethylamino) benzophenone, titanocenes, (2-hydroxy-1-[4-(4-(2-hydroxy-2-methylpropionyl)phenoxy)phenyl]-2-methylpropan-1-one), piparazine-based aminoalkyl phenones, poly (ethyleneglycol)bis(p-dimethylamino)benzoate, di-esters of carboxymethoxy thioxanthone and polytetramethylene glycol and mixtures of at least two of the above-mentioned photoinitiators.

In a further embodiment of the invention, the at least one photoinitiator has a content of 2 wt % to 20 wt. %, in particular 5 wt % to 15 wt. %, preferably 7 wt % to 15 wt. %, relative to the total weight of the UV-curing primer composition.

In a further embodiment of the invention, the UV-curing primer composition further comprises at least one synergist, in particular a tertiary amine. A synergist is preferably used in combination with a photoinitiator of Norrish type II, as the former is capable of particularly effectively forming initiator radicals and therefore increasing the reactivity.

In a further embodiment of the invention, the UV-curable primer composition further comprises at least one additive selected from the group composed of stabilizers, fillers, flow control additives, lubricants and mixtures of at least two of the above-mentioned additives.

In the context of the present invention, the term "flow control additive" is to be understood as referring to an additive intended to compensate for unevenness of a primer layer produced on a glass surface by application of the primer composition according to the invention. Furthermore, the UV-curing primer composition can be pigment-free, i.e. free of pigments, and/or colour-free, i.e. free of colouring agents.

According to a second aspect, the invention relates to use of at least one organosilane, which possesses at least one acetoxy radical, preferably 1 to 4 acetoxy radicals, i.e. 1 acetoxy radical, 2 acetoxy radicals, 3 acetoxy radicals or 4 acetoxy radicals, for the provision or production of a UV-cured primer layer on glass, in particular for subsequent further coating of the glass in a digital printing process, preferably an inkjet printing process, and/or for the provision or production of a UV-cured primer ink layer on glass.

The at least one organosilane preferably has Formula I below:

$$(AcO)_n(R)_{3-n}Si\text{-}L\text{-}R^1 \quad (I)$$

where
n is 1, 2 or 3, preferably 3,
AcO is the acetoxy radical,
R is an alkyl radical, an alkoxy radical or an aryloxy radical,
Si is silicon,
L is a divalent linear or a divalent branched hydrocarbon radical, and
$R^1$ is a reactive organic group.

Preferably, the at least one organosilane is 3-methacryloxypropyltriacetoxysilane.

Alternatively, the at least one silane can be vinyltriacetoxysilane.

Furthermore, it can be preferred according to the invention if the at least one organosilane has Formula II below:

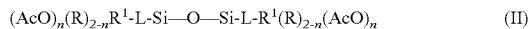

$$(AcO)_n(R)_{2-n}R^1\text{-}L\text{-}Si\text{-}O\text{-}Si\text{-}L\text{-}R^1(R)_{2-n}(AcO)_n \quad (II)$$

where
n is 1 or 2,
AcO is the acetoxy radical,
R is an alkyl radical, an alkoxy radical or an aryloxy radical,
Si is silicon,
L is a divalent linear or a divalent branched hydrocarbon radical, and
$R^1$ is a reactive organic group.

Preferably, the at least one organosilane is 1,3-bis(3-methacryloxypropyl)-1,1,3,3-tetraacetoxysilane or 1,3-bis(3-methacryloxypropyl)-1,1,3,3-tetraacetoxydisiloxane.

With respect to further features and advantages of the use of at least one organosilane, in particular at least one organosilane per se, reference is made to comments made in connection with the first aspect of the invention in their entirety. The features and advantages described therein, particularly with respect to the at least one organosilane, also apply correspondingly to use according to the second aspect of the invention.

According to a third aspect, the invention relates to a method for coating glass, in particular for coating glass hollow bodies, in which
a primer composition according to the first aspect of the invention is applied to at least part of an optionally pre-treated glass surface in layer form, i.e. with formation of a primer layer,
the applied primer is partially, in particular only partially, cured or crosslinked by UV radiation, and optionally
at least one further coating is applied to at least part of the partially cured or crosslinked primer layer.

The glass hollow bodies, which in particular can be coated by the method according to the invention, can be glass containers or glass bottles.

In a further embodiment of the invention, the primer composition is applied completely, i.e. to the entire glass surface, in layer form.

As mentioned above, the applied primer layer is partially, in particular only partially, cured or crosslinked by UV radiation. Partial curing or crosslinking of the applied primer layer ensures that the primer layer is still sufficiently reactive on UV irradiation to optionally allow coupling to the further coating.

In a further embodiment of the invention, the primer composition is applied to the glass surface in a digital printing process, in particular an inkjet printing process.

In the context of the present invention, the term "digital printing process" is to be understood as referring to a printing process in which the print image is transferred by a computer directly to a printer without using a static or fixed printing form.

In the context of the present invention, the term "inkjet printing process" is to be understood as referring to a method in which small droplets of liquid ink are produced and applied to a glass substrate. In this case, there is the possibility on the one hand of producing a continuous inkjet (CU) or on the other of discontinuously producing individual drops that are produced and transferred to the substrate only when needed (drop-on-demand, DOD).

In a further embodiment of the invention, the primer composition and/or the further coating are applied in an air atmosphere that is free of water or free of moisture, or in an air atmosphere that is essentially free of water or free of moisture.

In the context of the present invention, the term "an air atmosphere that is essentially free of water or free of moisture" is to be understood as referring to an air atmosphere, i.e. a volume of air or stream of air, that has a water content<8.5 g/Nm$^3$, in particular <1 g/Nm$^3$, preferred <0.1 g/Nm$^3$, more preferred <0.01 g/Nm$^3$, in particular from 0.0001 g/Nm$^3$ to 0.1 g/Nm$^3$, preferably at 25° C. and a pressure of 101.325 kPa.

In the context of the present invention, the unit "Nm$^3$" is to be understood as referring to standard cubic meters.

Preferably, the primer composition and/or the further coating are applied in an air atmosphere that has a water content of 0.1 g/Nm$^3$ or a water content<0.1 g/Nm$^3$. Particularly preferred, the primer composition and/or the further coating are applied in an air atmosphere that has a water content of 0.003 g/Nm$^3$ or a water content<0.003 g/Nm$^3$.

Owing to the use of an air atmosphere that is free of water or free of moisture, or an air atmosphere that is essentially free of water or free of moisture, during the application of the primer composition and/or the further coating, the durability of the applied primer, in particular after curing and/or cross-linking of the primer, can be improved with particular advantage. Further, as a result thereof, a long-term improved wet adhesive strength of a decoration can be achieved owing to prevention of undesired premature hydrolysis of the adhesion-promoting primer. Another advantage is related to an improved open condition of a printing head used for applying the primer.

For generating an air atmosphere that is free of water or free of moisture, or an air atmosphere that is essentially free of water or free of moisture, in particular air dryers, like condensation dryers, membrane dryers or adsorption dryers, for example, can be employed. For example, a membrane air dryer of the type named MS-LDM-1 (Festo) can be employed. As an alternative, an adsorption dryer of the type series PDAD (Festo) can be employed. Furthermore, for generating an air atmosphere that is free of water or free of moisture, or an air atmosphere that is essentially free of water or free of moisture, a drying agent, like silica gel, for example, can be employed. For that purpose, the drying agent can be filled into a drying tube, for example. As an example for a suitable drying agent reference is made to the commercially available silica gel named "ST-Trockenperlen" (Steiner GmbH Chemie u. Labortechnik). The use of a drying agent can be advantageous in particular in case of low air flows and/or air volumes used, for example with pressure equalizing ports in ink supply systems.

For generating an air atmosphere that is free of water or free of moisture, or an air atmosphere that is essentially free of water or free of moisture, a stream of dried air can be passed along a nozzle plate of a printing head during one or more printing procedures and/or along the glass surface during printing break intervals.

As an alternative or in combination, air feeding of an ink supply system (in case of an inkjet printing process) can be separate from environmental air and dried air can be supplied to these locations in a controlled manner.

As an alternative or in combination, for generating an air atmosphere that is free of water or free of moisture, or an air atmosphere that is essentially free of water or free of moisture, the casing of a printing machine can be flushed and vented completely with dried air.

For maintaining an air atmosphere that is free of water or free of moisture, or an air atmosphere that is essentially free of water or free of moisture, it can furthermore be advantageous to control the room air humidity prior to and/or during the application of the primer composition and/or the further coating.

In a further embodiment of the invention, the further coating is applied completely, i.e. over the entire surface of the partially cured or crosslinked primer layer.

In a further embodiment of the invention, a UV-curing ink is used as a further coating. The UV-curing ink preferably comprises a binder, a pigment, a photoinitiator and optionally additives. In particular, suitable binders are reactive oligomers and/or reactive monomers. Reference is therefore made to the corresponding comments made in connection with the first aspect of the invention. The reactive oligomers and/or reactive monomers described therein in connection with the UV-curable primer composition can also be contained in the UV-curing ink. Furthermore, with respect to the photoinitiator of the UV-curing ink as well, reference is made to the corresponding comments made in connection with the first aspect of the invention. The photoinitiators described therein by way of example in connection with the UV-curing primer composition can also be contained in the UV-curing ink. In particular, the optionally provided additives can be selected from the group composed of stabilizers, fillers, flow control additives, lubricants and mixtures of at least two of the above-mentioned additives.

In a further embodiment of the invention, a non-UV-curing ink is used as a further coating. The non-UV-curing ink preferably comprises a binder, a pigment, one or a plurality of solvents and optionally additives. Examples of suitable binders are compounds with functional groups, selected from the group composed of epoxy groups, amine groups, isocyanate groups and combinations of at least two of the above-mentioned functional groups. The optionally provided additives can be selected in particular from the group composed of stabilizers, fillers, flow control additives, lubricants and mixtures of at least two of the above-mentioned additives. For this embodiment of the invention, the reactive organic group $R^1$ of the at least one organosilane according to Formula I and/or II is preferably a functional group that can react with the binders described in this paragraph.

In a further embodiment of the invention, the further coating, in particular the UV-curing ink or the non-UV-curing ink, preferably the UV-curing ink, is applied in a digital printing process, in particular in an inkjet printing process.

In a further embodiment of the invention, the glass surface is pre-treated, preferably in order to change its surface properties. The pre-treatment is preferably carried out by flame treatment and/or flame pyrolysis coating, in particular silicate treatment. In flame treatment, the glass surface is preferably broken up or activated by means of a fuel gas flame, and because of the oxygen contained in the fuel gas or fuel gas mixture, OH— and/or OOH groups are deposited on the broken up or activated glass surface. This gives rise to polar groups on the glass surface, allowing the UV-curing primer composition to better adhere. In flame pyrolysis coating, a suitable starting compound, a so-called precursor, is added to a fuel gas in order to produce a first layer. If a silicate layer, in particular an amorphous silicate layer, can be produced on the glass surface by combustion of the starting compound or precursor, the flame pyrolysis coating can also be referred to within the meaning of the present invention as silicate treatment. In this case, the starting compound or the precursor is burned in the gas flame to form microscopically small silicon dioxide particles. These strike the glass surface, where they cool and form a preferably hydrophilic silicate layer on the surface, in particular with a layer thickness of 5 nm to 100 nm. Because of irregularities, the silicate layer particularly advantageously possesses an extremely large wetting surface, which allows the adhesion of the UV-curing primer composition on the glass surface to be further improved. In particular, suitable starting compounds or precursors for silicate treatment of a glass surface are silanes and/or siloxanes.

In a further embodiment of the invention, the applied further coating is cured, preferably by means of UV radiation. In this curing process, the primer layer is also preferably completely cured.

In a further embodiment of the invention, the method is characterized by at least the following method steps:
pre-treatment of a glass surface by flame treatment and/or silicate treatment by means of flame pyrolysis,
application of the UV-curing primer composition according to the first aspect of the invention by means of an inkjet printing process to at least part of the pre-treated glass surface,
partial curing or crosslinking of the primer composition with UV radiation,
application of at least one further coating of a UV-curing ink in an inkjet printing process to at least part of the partially crosslinked primer layer, and
curing of the applied UV ink with UV radiation.

In a further embodiment of the invention, the method is carried out at a temperature of 20° C. to 50° C.

In a further embodiment of the invention, the UV radiation is produced by means of a UV lamp, such as for example a mercury emitter, or by means of an LED emitter.

With respect to further features and advantages of the method, in particular the UV-curing primer composition and/or the (partially or completely) cured or crosslinked primer composition, in order to avoid repetition, reference is also made to the above description in its entirety, in particular to the comments made in connection with the first aspect of the invention. The features and advantages described therein, particularly with respect to the UV-curing primer composition and the (partially or completely) cured or crosslinked primer composition, also apply correspondingly to the method according to the third aspect of the invention.

According to a fourth aspect, the invention relates to a substrate of glass, in particular a glass hollow body, such as for example a glass container or a glass bottle, or a glass sheet element, such as for example a glass plate. The substrate is at least partially coated, in particular printed, with a UV-cured or UV-crosslinked primer composition according to the first aspect of the invention.

With respect to further features and advantages of the substrate, in particular of the UV-cured or UV-crosslinked primer composition, in order to avoid repetition, reference is also made to the above description in its entirety, in particular to the comments made in connection with the first aspect of the invention. The features and advantages described therein, particularly with respect to the UV-curing primer composition, also apply correspondingly to the substrate according to the fourth aspect of the invention.

According to a fifth aspect, the invention relates to an ink, in particular a primer ink, preferably a UV-curing primer ink, which comprises at least one organosilane possessing at least one acetoxy radical, in particular 1 acetoxy radical, 2 acetoxy radicals, 3 acetoxy radicals or 4 acetoxy radicals.

The ink can generally be a white, coloured, metallic or colourless ink.

In particular, the ink can comprise at least one pigment, which is preferably selected from the group composed of titanium dioxide, carbon black, aluminium, inorganic pigments, organic pigments and mixtures of at least two of the aforementioned pigments.

Preferably, the ink is a decoration ink.

With respect to further features and advantages of the ink, in order to avoid repetition, reference is also made to the above description in its entirety, in particular to the comments made in connection with the first aspect of the invention. The features and advantages described therein, particularly with respect to the at least one organosilane, also apply correspondingly to the ink according to the fifth aspect of the invention.

According to a sixth aspect, the invention relates to a kit for the provision or production of a UV-cured primer layer on glass and/or for the provision or production of an ink layer, in particular a UV-cured ink layer, on glass, preferably for the provision or production of an ink layer, in particular a UV-cured ink layer, on the UV-cured primer layer. The ink layer can optionally be a primer ink layer.

The kit comprises, spatially separated from one another, a UV-curable primer composition according to the first aspect of the invention and at least one further component, selected from the group composed of at least one ink, a UV lamp, an LED emitter, an LED-UV drier unit, a digital printing head, a digital printing system and combinations of at least two of the aforementioned components.

Alternatively, the kit comprises, spatially separated from one another, an ink according to the fifth aspect of the invention and at least one further component selected from the group composed of at least one further ink, a UV lamp, an LED emitter, an LED-UV drier unit, a digital printing head, a digital printing system and a combination of at least two of the aforementioned components.

The at least one ink or the at least one further ink can be a UV-curing or non-UV-curing ink, in particular a set of various UV-curing inks and/or various non-UV-curing inks. Preferably, the at least one ink is a UV-curing ink, in particular a set of various UV-curing inks.

In particular, the at least one ink or the at least one further ink can be a white, coloured, metallic or colourless ink.

In particular, the at least one ink or the at least one further ink can comprise at least one pigment, preferably selected from the group composed of titanium dioxide, carbon black, aluminium, inorganic pigments, organic pigments and mixtures of at least two of the aforementioned pigments.

Particularly preferably, the kit according to the invention comprises an ink, in particular primer ink, according to the first or fifth aspect of the invention and at least one further ink, wherein the at least one further ink is selected from the group composed of white ink, coloured ink, metallic ink, colourless ink and sets of at least two of the above-mentioned inks. As mentioned above, the at least one further ink can be a UV-curing and/or non-UV-curing ink. In the forms described in this paragraph, the kit according to the invention can also be referred to as an ink set.

Furthermore, the at least one ink can be an ink according to the fifth aspect of the invention.

For example, the UV lamp can be a mercury emitter.

The digital printing head is preferably an inkjet printing head.

The digital printing system is preferably an inkjet printing system.

With respect to further features and advantages of the kit, in order to avoid repetition, reference is made to the above description in its entirety, in particular to the comments made in connection with the first aspect of the invention. The features and advantages described therein, particularly with respect to the UV-curing primer composition and ink, also apply correspondingly to the kit according to the sixth aspect of the invention.

Further features and advantages of the invention are given in the following description of preferred embodiments in the form of examples. In this case, individual features of the invention may be implemented independently or in combination with one another. The examples described below serve only to further explain the invention, without limiting the invention to the disclosed content of the examples.

EXAMPLE SECTION

Example 1

Printing of Glass Surfaces With Various UV-Curable Primer Compositions

Glass plates (Floatglas dinA5 3 mm from Glassolutions Saint Gobain GmbH) were printed with the primer compositions shown in Tables 1-3 below:

TABLE 1

Formulation of a primer composition according to the invention

| Ingredient | | Parts (wt %) |
|---|---|---|
| Monomer | Isobornyl acrylate | 68.5 |
| Monomer | (Octahydro-4,7-methano-1H-indendyl)bis(methylene)diacrylate | 12.5 |
| Photoinitiator | Diphenyl(2,4,6-trimethylbenzoyl)phosphine oxide | 9.0 |
| Organosilane 1 | 3-methacryloxypropyl-triacetoxysilane | 8.5 |

TABLE 1-continued

Formulation of a primer composition according to the invention

| Ingredient | | Parts (wt %) |
|---|---|---|
| Organosilane 2 | 1,3-bis(3-methacryloxypropyl)-1,1,3,3-tetraacetoxydisiloxane | 1.5 |

The formulation of a primer composition according to the invention given in Table 1 above is also abbreviated below as "primer 1".

TABLE 2

Formulation of a primer composition not according to the invention

| Ingredient | | Parts (wt %) |
|---|---|---|
| Monomer | Isobornyl acrylate | 68.5 |
| Monomer | (Octahydro-4,7-methano-1H-indendyl)bis(methylene)diacrylate | 12.5 |
| Photoinitiator | Diphenyl(2,4,6-trimethylbenzoyl)phosphine oxide | 9.0 |
| Organosilane | 3-methacryloxypropyl-trimethoxysilane | 10.0 |

The primer composition given in Table 2 above and used for comparison purposes is also abbreviated below as "primer 2".

TABLE 3

Formulation of a further primer composition not according to the invention

| Ingredient | | Parts (wt %) |
|---|---|---|
| Monomer | Isobornyl acrylate | 68.5 |
| Monomer | (Octahydro-4,7-methano-1H-indendyl)bis(methylene)diacrylate | 12.5 |
| Photoinitiator | Diphenyl(2,4,6-trimethylbenzoyl)phosphine oxide | 9.0 |
| Organosilane | (3-Acryloxypropyl)tri-methoxysilane | 10.0 |

The primer composition given in Table 3 above and also used for comparison purposes is also abbreviated below as "primer 3".

The glass plates were printed with the primer compositions shown in the above table with and without prior silicate pre-treatment. Printing was carried out by manual pressure using a no. 2 spiral doctor blade. For this purpose, the glass plates were first printed with the primer by manual pressure. After this, intermediate curing was carried out using a mercury drier from the firm IST (two 120 W/cm lamps, tape speed 20 m/min). After this, overprinting was carried out using White 7100/82464170Z or White 7100/79095170 (manufacturer: Marabu GmbH & Co. KG). This was followed by post-curing with the mercury drier from the firm IST (two 120 W/cm lamps, tape speed 10 m/min).

Adhesion Tests:

The adhesion of the printed primer composition was validated by means of the cross-cut test (according to DIN EN ISO 2409). The cross-cut was carried out immediately after immersion in water on the still-wet substrate. An adhesive tape (Tesa 4101) was applied to the substrate immediately after it was wiped dry. After this, the adhesive tape was pulled off. The adhesion results are shown in Tables 4 to 6 below:

With pre-treatment of the glass surfaces and immersion in water at room temperature:

TABLE 4

Cross-cut parameters after pre-treatment of the glass surfaces and/or after immersion in water at room temperature

| Test | Primer | White overprinting | Cross-cut before immersion in water | After 3 h immersion in water | After 24 h immersion in water |
|---|---|---|---|---|---|
| Test 1 | Primer 1 | 7100/82464170 | CP0 | CP0 | CP0 |
| Test 2 | Primer 1 | 7100/79095170 | CP0 | CP0 | CP0 |
| Test 3 | Primer 2 | 7100/82464170 | CP0 | CP5 | CP5 |
| Test 4 | Primer 2 | 7100/79095170 | CP0 | CP3-4 | CP3 |
| Test 5 | Primer 3 | 7100/82464170 | CP1-2 | CP5 | CP5 |
| Test 6 | Primer 3 | 7100/79095170 | CP0 | CP5 | CP3-4 |

With pre-treatment of the glass surfaces and after immersion in water at elevated temperature:

TABLE 5

Cross-cut parameters after pre-treatment and/or after immersion in water at elevated temperature

| Test | Primer | White overprinting | Water bath | Cross-cut |
|---|---|---|---|---|
| Test 7 | Primer 1 | 7100/82464170 | 0.5 h 60° C. | CP0 |
| Test 8 | Primer 1 | 7100/79095170 | 0.5 h 60° C. | CP0 |
| Test 9 | Primer 1 | 7100/82464170 | 0.5 h 60° C. + 1 h 70° C. | CP0 |
| Test 10 | Primer 1 | 7100/79095170 | 0.5 h 60° C. + 1 h 70° C. | CP0 |

Without pre-treatment of the glass surface and immersion in water at room temperature:

TABLE 6

Determined cross-cut parameters without pre-treatment

| Test | Primer | White overprinting | Cross-cut before immersion in water | Cross-cut after 24 h immersion in water |
|---|---|---|---|---|
| Test 11 | Primer 1 | 7100/82464170 | CP0 | CP0 |
| Test 12 | Primer 1 | 7100/79095170 | CP0 | CP0 |

The adhesion test confirmed the superiority of the primer composition according to the invention ("primer 1") under the effect of water compared to the primer compositions "primer 2" and "primer 3" used for comparison purposes and showed that in this case, is it possible that pre-treatment can be dispensed with.

Example 2

Printing on a Glass Surface Using a Further UV-Curable Primer Composition According to the Invention Glass plates (Floatglas dinA5 3 mm from the firm Glas-solutions Saint Gobain GmbH) and shaped bottles (Braunglas HKL III, manufacturer: Stölzle-Oberglas GmbH) were printed using a UV-curable primer composition with the following formulation:

TABLE 7

Formulation of a further primer composition according to the invention

| Ingredient | | Content (wt %) |
|---|---|---|
| Monomer | Isobornyl acrylate | 68.5 |
| Monomer | (Octahydro-4,7-methano-1H-indendiyl)bis(methylene)diacrylate | 12.5 |
| Photoinitiator | Diphenyl(2,4,6-trimethylbenzoyl)phosphine oxide | 9.0 |
| Organosilane 1 | 3-methacryloxypropyl-triacetoxysilane | 7.0 |
| Organosilane 2 | 1,3-bis(3-methacryloxypropyl)-1,1,3,3-tetraacetoxydisiloxane | 2.0 |
| Additive | Stabilizer | 1.0 |

The above primer composition had a viscosity of 10.0 mPas and a surface tension of 31.2 mN/m at 40° C.

The above-mentioned glass plates and the shaped bottles were printed as follows:

The glass plates and shaped bottles were first subjected to flame treatment and/or silicate treatment. The glass surfaces treated in this manner were then printed with the primer composition given in Table 7 above. Printing was carried out by means of an inkjet printing system (model XY300 from the firm Industrial Inkjet Ltd.). The printing heads used were model KM1024iM from the manufacturer Konica-Minolta Business Solutions Deutschland GmbH. Printing was carried out using single pass technology with a resolution of 360×360 dpi. The printing speed was 200 mm/s.

After application of the primer composition (with a delay of 12 s), intermediate curing, i.e. partial crosslinking, was carried out using an LED emitter (Pinning-Lampe LED 395 nm 8 W from Dr. Hönle AG). After this, overprinting was carried out with White 7100/82464170Z (manufacturer: Marabu GmbH & Co. KG), followed without delay by intermediate curing using the above-mentioned LED emitter. Post-curing was carried out without delay using a model VZERO2 085 mercury lamp (manufacturer: Integration Technology Ltd.).

The primer composition used could be processed in the inkjet printing system without difficulty, particularly without clogging of the printing heads and/or corrosive damage.

Adhesion Tests:

The adhesion of the printed primer composition was validated by means of the cross-cut test (according to DIN EN ISO 2409). Cross-cutting was carried out directly on the still-wet substrate after immersion in water. An adhesive tape (Tesa 4101) was applied to the substrate immediately after it was wiped dry. After this, the adhesive tape was pulled off. The cross-cut parameters (CP) are given in Table 8 below:

TABLE 8

Determined cross-cut parameters

| Cross-cut | Glass plate | Bottle |
|---|---|---|
| Drying | CP1 | CP1-2 |
| After 1 h water bath at room temperature | CP1 | CP1-2 |
| After 24 h water bath at room temperature | CP1 | CP 1-2 |

The tests carried out confirmed the outstanding printability and the outstanding adhesive strength of the primer composition on glass surfaces. The adhesion tests also showed that the adhesive strength of the applied primer composition was not impaired or at least not significantly impaired even after immersion in water for several hours. The validated primer composition was thus characterized by outstanding resistance to water.

3. Analysis of the effect of air moisture on the open condition of a printing head:

In a test stand for inkjet printing heads (XY300 by Industrial Inkjet, UK) a printing head of Konica Minolta (Type KM1024MHE-D) was filled with a primer via an injector with hose and subjected to printing once a week and checked for failed nozzles thereby. During the test period, the printing head was not capped so that a nozzle plate was always exposed to environmental air.

Test 1:

The air moisture was 40% (rel.). The air temperature was 25° C. After a test period of 6 weeks, the first nozzles failed. The failed nozzles could not be regenerated by cleaning.

Test 2:

The air moisture in the environment of the printing head was lowered to 0.5% (rel.) by supplying dried air. Even after 6 months, there was no change detectable on the printing head.

The invention claimed is:

1. A UV-curing primer composition for the coating of glass, wherein the primer composition, in addition to reactive oligomers and/or reactive monomers and in addition to at least one photoinitiator, comprises at least one organosilane that possesses at least one acetoxy radical, wherein the at least one organosilane has Formula II below:

$$(AcO)_n(R)_{2-n}(R^1\text{-}L)Si\text{—}O\text{—}Si(L\text{-}R^1)(R)_{2-n}(AcO)_n \quad (II)$$

where
n is 1 or 2,
AcO is the acetoxy radical,
R is an alkyl radical, a methyl radical, an ethyl radical, an n-propyl radical or an isopropyl radical, an alkoxy radical, a methoxy radical, an ethoxy radical or an isopropoxy radical, or an aryloxy radical,
Si is silicon,
L is a divalent linear or a divalent branched hydrocarbon radical, and
$R^1$ is a reactive organic group.

2. The primer composition according to claim 1, further comprising at least one organosilane of Formula I below:

$$(AcO)_n(R)_{3-n}Si\text{-}L\text{-}R^1 \quad (I)$$

where
n is 1-3,
AcO is the acetoxy radical,
R is an alkyl radical, a methyl radical, an ethyl radical, an n-propyl radical or an isopropyl radical, an alkoxy radical, a methoxy radical, an ethoxy radical or an isopropoxy radical, or an aryloxy radical,
Si is silicon,
L is a divalent linear or a divalent branched hydrocarbon radical, and
$R^1$ is a reactive organic group.

3. The primer composition according to claim 2, wherein the reactive organic group $R^1$ is an organic group, which under the action of ultraviolet radiation or in the presence of the at least one photoinitiator, can be caused to react, wherein the reactive organic group comprises a vinyl radical, an allyl radical, an acrylate radical or a methacrylate radical.

4. The primer composition according to claim 2, wherein the organo silane is 3-methacryloxypropyltriacetoxysilane.

5. Method for coating glass or glass hollow bodies, wherein a primer composition comprising at least one organosilane as defined in claim 2 is applied to at least part of an optionally pre-treated glass, the applied primer layer is partially crosslinked by UV radiation, and at least one further coating is applied to at least part of the crosslinked primer layer, wherein the at least one further coating is applied in a digital printing process or an inkjet printing process.

6. The primer composition according to claim 1, wherein the organo silane is 1,3-bis(3-methacryloxypropyl)-1,1,3,3-tetraacetoxydisiloxane.

7. The primer composition according to claim 1, further comprising at least one pigment selected from the group composed of titanium dioxide, carbon black, aluminum, inorganic pigments, organic pigments and mixtures of at least two of the aforementioned pigments.

8. A method of coating glass, in particular for or coating glass hollow bodies, comprising:

applying a primer composition according to claim 1 to at least part of an optionally pre-treated glass surface, partially crosslinking the applied primer layer by UV radiation, and optionally applying at least one further coating to at least part of the crosslinked primer layer, wherein the primer composition is applied to the glass surface in a digital printing process or an inkjet printing process.

9. The method according to claim 8, wherein the primer composition and/or the further coating are applied in an air atmosphere having a water content <8.5 g/Nm³.

10. The method according to claim 8, wherein the further coating is applied in the digital printing process, or the inkjet printing process.

11. The method according to claim 8, further comprising:

pre-treating the glass surface by flame treatment and/or silicate treatment by flame pyrolysis, applying the UV-curing primer composition by the inkjet printing process to at least part of the pre-treated glass surface, partially crosslinking the primer composition with UV radiation, applying at least one further coating of a UV-curing ink in the inkjet printing process to at least part of the crosslinked primer layer, and curing the applied UV ink with UV radiation.

12. Method according to claim 8, wherein the primer composition is applied to the glass surface in a digital printing process or an inkjet printing process.

13. Method according to claim 8, wherein the at least one further coating is a UV-curing ink.

14. A substrate of glass, a glass container or a glass bottle, at least partially coated or printed with the UV-crosslinked primer composition according to claim 1.

15. Ink comprising at least one organosilane possessing at least one acetoxy radical, wherein the at least one organosilane is an organosilane which is defined in claim 1.

16. A kit that provides a UV-cured primer layer on glass and/or provides an ink layer or a UV-cured ink layer, on glass, wherein the kit comprises the primer composition for the coating of glass, and the primer composition, in addition to reactive oligomers and/or reactive monomers and in addition to at least one photoinitiator, comprises at least one organosilane possessing at least one acetoxy radical, wherein the at least one organosilane has Formula II below:

$$(AcO)_n(R)_{2-n}(R^1\text{-L})Si\text{—}O\text{—}Si(L\text{-}R^1)(R)_{2-n}(AcO)_n \qquad (II)$$

where n is 1 or 2,

AcO is the acetoxy radical,

R is an alkyl radical, a methyl radical, an ethyl radical, an n-propyl radical or an isopropyl radical, a methoxy radical, an ethoxy radical or an isopropoxy radical, an alkoxy radical, or an aryloxy radical, Si is silicon, L is a divalent linear or a divalent branched hydrocarbon radical, and $R^1$ is a reactive organic group, or the ink according to claim 15 and at least one further component selected from the group composed of at least one further ink, a UV lamp, an LED emitter, an LED-UV drier unit, a digital printing head, a digital printing system and combinations of at least two of the aforementioned components.

17. The primer composition according to claim 15, wherein the at least one acetoxy radical comprises 2 to 4 acetoxy radicals.

18. The primer composition according to claim 1, wherein the glass is glass hollow bodies.

19. The primer composition according to claim 1, wherein the at least one acetoxy radical comprises 2 to 4 acetoxy radicals.

* * * * *